US011113533B2

(12) United States Patent
Bergendahl et al.

(10) Patent No.: US 11,113,533 B2
(45) Date of Patent: *Sep. 7, 2021

(54) SMART DISPLAY APPARATUS AND CONTROL SYSTEM

(71) Applicant: INTERNATIONAL BUSINESS MACHINES CORPORATION, Armonk, NY (US)

(72) Inventors: Marc A. Bergendahl, Rensselaer, NY (US); Christopher J. Penny, Saratoga Springs, NY (US); James J. Demarest, Rensselaer, NY (US); Christopher Waskiewicz, Rexford, NY (US); Jean Wynne, Nassau, NY (US); Jonathan Fry, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,473

(22) Filed: Sep. 17, 2019

(65) Prior Publication Data
US 2020/0026924 A1 Jan. 23, 2020

Related U.S. Application Data

(63) Continuation of application No. 15/839,091, filed on Dec. 12, 2017, now Pat. No. 10,528,817.

(51) Int. Cl.
*G06K 9/00* (2006.01)
*G06F 3/01* (2006.01)
(Continued)

(52) U.S. Cl.
CPC ......... *G06K 9/00691* (2013.01); *G06F 3/013* (2013.01); *G06K 9/00342* (2013.01);
(Continued)

(58) Field of Classification Search
CPC ........... G06K 9/00691; G06K 9/00342; G06K 9/00771; B60J 3/04; E06B 2009/2464; G06F 3/017; G02B 27/0093
See application file for complete search history.

(56) References Cited

U.S. PATENT DOCUMENTS 6,770,534 B2    8/2004  Cho et al.
7,683,428 B2    3/2010  Chidambarrao et al.
(Continued)

FOREIGN PATENT DOCUMENTS

CN    101533467 B    7/2013
WO    2008/132741 A2  11/2008

OTHER PUBLICATIONS

Soundlazer, "What is a parametric speaker?" http://www.soundlazer.com/what-is-a-parametric-speaker/ Website maintained by Richard Haberkern. Downloaded Nov. 3, 2017. pp. 1-7.
(Continued)

*Primary Examiner* — Jon Chang
(74) *Attorney, Agent, or Firm* — Tutunjian & Bitetto, P.C.; Randall Bluestone

(57) ABSTRACT

A computer-implemented method executed by a processor for reducing exposure of a plurality of objects to environmental conditions by employing a smart room tracking system is presented. The computer-implemented method includes counting a number of individuals within a space including the plurality of objects via one or more image capture devices and determining whether each individual makes direct eye contact with any of the plurality of objects by evaluating orientation, posture, and eye movement of each individual. The computer-implemented method further includes shielding, via an object viewing controller, an object of the plurality of objects from view when no direct eye contact is determined and making an object of the
(Continued)

plurality of objects viewable, via the object viewing controller, when direct eye contact is determined.

20 Claims, 8 Drawing Sheets

(51) Int. Cl.
*B60J 3/04* (2006.01)
*E06B 9/24* (2006.01)
*H04N 7/18* (2006.01)
*H04W 4/38* (2018.01)
*H04W 4/70* (2018.01)

(52) U.S. Cl.
CPC .............. *H04N 7/181* (2013.01); *H04W 4/38* (2018.02); *H04W 4/70* (2018.02); *B60J 3/04* (2013.01); *E06B 2009/2464* (2013.01)

(56) References Cited

U.S. PATENT DOCUMENTS

| | | | |
|---|---|---|---|
| 7,965,866 B2 | 6/2011 | Wang et al. | |
| 8,011,510 B1 | 9/2011 | Smith, II et al. | |
| 8,749,482 B2 | 6/2014 | Lashina et al. | |
| 9,087,056 B2 | 7/2015 | Cohen | |
| 9,287,362 B1 | 3/2016 | Basu et al. | |
| 9,645,395 B2 | 5/2017 | Bolas et al. | |
| 9,658,687 B2 | 5/2017 | Gibson et al. | |
| 2006/0261406 A1 | 11/2006 | Chen | |
| 2011/0069869 A1 | 3/2011 | Lashina et al. | |
| 2011/0128223 A1* | 6/2011 | Lashina | G06F 3/012 345/158 |
| 2012/0300061 A1 | 11/2012 | Osman et al. | |
| 2014/0268356 A1 | 9/2014 | Bolas et al. | |
| 2014/0320950 A1* | 10/2014 | Saxe | A47F 11/06 359/296 |
| 2015/0002676 A1* | 1/2015 | Yoo | G02B 27/017 348/159 |
| 2015/0002768 A1 | 1/2015 | Wu | |
| 2015/0261293 A1 | 9/2015 | Wilairat et al. | |

OTHER PUBLICATIONS

Wikipedia, "Active shutter 3D system," https://en.wikipedia.org/w/index.php?title=Active_shutter_3D-system&oldid=798871494. Last edited Sep. 4, 2017. Downloaded Nov. 3, 2017. pp. 1-8.

Wikipedia, "Foveated imaging," https://en.wikipedia.org/wiki/Foveated_imaging. Last edited Jun. 9, 2017. Downloaded Nov. 3, 2017. pp. 1-4.

Wikipedia, "Gaze-contingency paradigm," https://en.wikipedia.org/wiki/Gaze-contingency_paradigm. Last edited Aug. 19, 2017. Downloaded Nov. 3, 2017. pp. 1-3.

Wikipedia, "Smart Glass," https://en.wikipedia.org/w/index.php?title=Smart_glass&oldid=807045618. Last edited Oct. 25, 2017. Downloaded Nov. 3, 2017. pp. 1-10.

List of IBM Patents or Patent Applications Treated as Related dated Sep. 17, 2019, 2 pages.

\* cited by examiner

SMART DISPLAY APPARATUS AND CONTROL SYSTEM

BACKGROUND

Technical Field

The present invention relates generally to heritage protection and conservation devices for objects or artifacts, and more specifically, to a smart room tracking system coupled with exhibit controllers and room interactive elements with patron tiered permissions for reducing exposure of objects or artifacts to adverse environmental conditions.

Description of the Related Art

Our long history and rich heritage includes a large number of cultural relics and artifacts. These unique, irreplaceable heritage and national treasures are desired to be viewed by the public, but also need to be protected from damage in the display process resulting from light, heat, humidity, gas, chemical aging, and other factors. Therefore, artifact display cabinets play a decisive role in the field of museum and heritage conservation. Such display cabinets are constructed from different shapes that can adapt to different exhibits and facilitate arrangement is combination displays. However, most display cabinets do not adequately protect the artifacts therein and can inadvertently aid in the slow destruction for precious and priceless artifacts.

SUMMARY

In accordance with one embodiment, a computer-implemented method executed by a processor for reducing exposure of a plurality of objects to environmental conditions by employing a smart room tracking system is presented. The computer-implemented method includes counting a number of individuals within a space including the plurality of objects via one or more image capture devices and determining whether each individual makes direct eye contact with any of the plurality of objects by evaluating orientation, posture, and eye movement of each individual. The computer-implemented method further includes shielding, via an object viewing controller, an object of the plurality of objects from view when no direct eye contact is determined and making an object of the plurality of objects viewable, via the object viewing controller, when direct eye contact is determined.

In accordance with another embodiment, a smart room tracking system for reducing exposure of a plurality of objects to environmental conditions is provided. The system includes one or more image capture devices for counting a number of individuals within a space including the plurality of objects, a tracking device for determining whether each individual makes direct eye contact with any of the plurality of objects by evaluating orientation, posture, and eye movement of each individual, and an object viewing controller for shielding an object of the plurality of objects from view when no direct eye contact is determined and making an object of the plurality of objects viewable when direct eye contact is determined.

In accordance with one embodiment, a non-transitory computer readable storage medium comprising a computer readable program for reducing exposure of a plurality of objects to environmental conditions by employing a smart room tracking system is provided. The computer readable program when executed on a computer causes the computer to perform the steps of counting a number of individuals within a space including the plurality of objects via one or more image capture devices, determining whether each individual makes direct eye contact with any of the plurality of objects by evaluating orientation, posture, and eye movement of each individual, shielding, via an object viewing controller, an object of the plurality of objects from view when no direct eye contact is determined, and making an object of the plurality of objects viewable, via the object viewing controller, when direct eye contact is determined.

Furthermore, embodiments can take the form of a related computer program product, accessible from a computer-usable or computer-readable medium providing program code for use, by or in connection with a computer or any instruction execution system. For the purpose of this description, a computer-usable or computer-readable medium may be any apparatus that may include means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
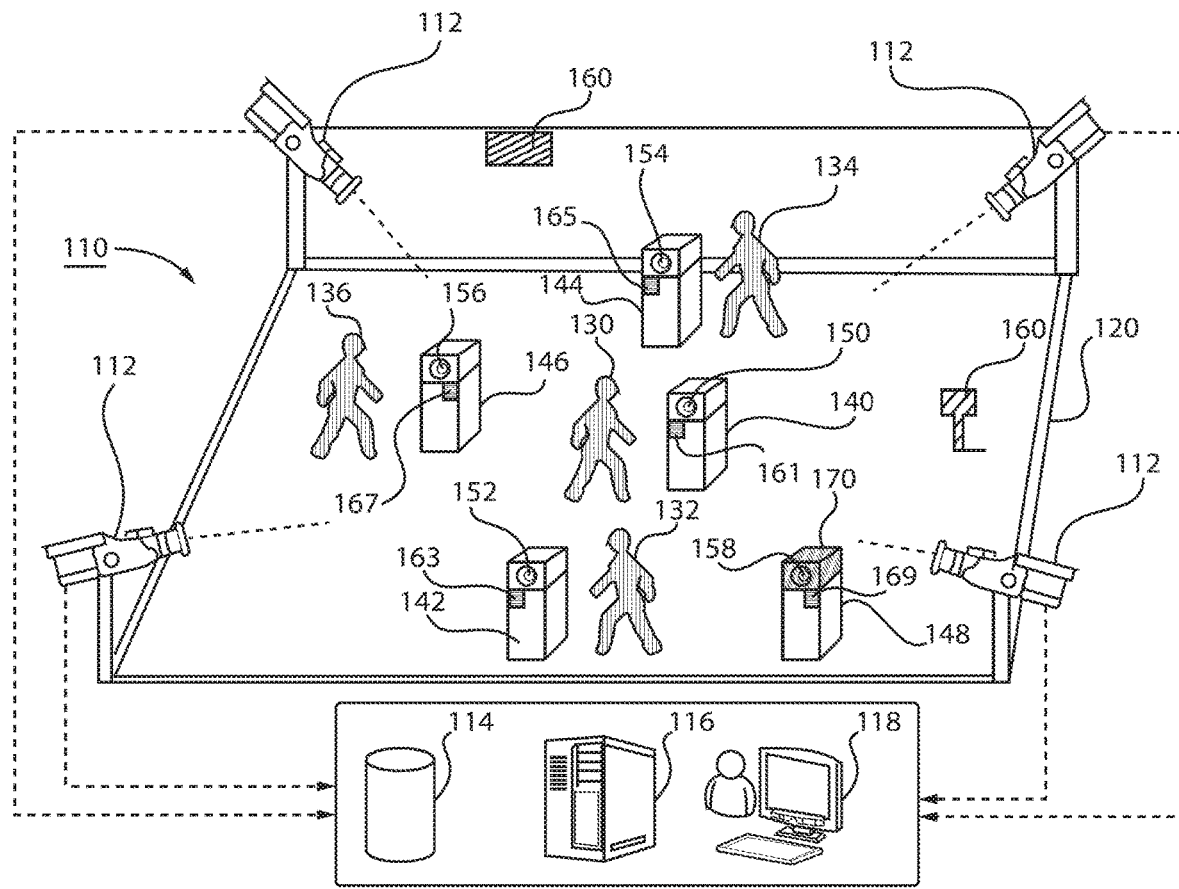
FIG. 1 is a smart room tracking system coupled with a plurality of exhibit controllers, in accordance with an embodiment of the present invention.

Embodiments in accordance with the present invention provide methods and devices for protecting and preserving cultural and heritage artifacts or relics or treasures displayed by, e.g., a museum. The primary mission of most history museums is to collect, preserve, exhibit and interpret objects of historical significance. Over time, all objects will begin to deteriorate for a variety of reasons, such as environmental conditions, use and natural decay. In order to maintain the objects in such condition that they will survive for the enjoyment and education of future generations, it is vital that museums practice proper preservation measures. Proper preservation measures can help stabilize or at least slow down an object's rate of deterioration, thus extending the life of the object. Wanting to display an artifact for the public to experience and wanting to preserve the artifact for posterity is a hard balance to achieve. Light is a source of damage to artifacts and the effects can be irreversible. A smart room tracking system is employed that allows light to reach an artifact only when the artifact is being directly viewed within a certain distance. This implementation can extend an amount of time an artifact can be on exhibit because it is not getting unnecessary light, thus allowing more people to see the prized artifacts in a museum's collection.

Embodiments in accordance with the present invention provide methods and devices for protecting and preserving cultural and heritage artifacts or relics or treasures by minimizing environmental factors affecting such artifacts. The major environmental factors that affect the long-term preservation of artifacts are light, temperature, relative humidity, air pollution and pests. Museums must take proper action to mitigate the possible damage of these factors. The present invention provides for a smart room tracking system coupled with a plurality of exhibit controllers and room interactive elements with a patron tiered permissions system. The smart room tracker allows the museum to observe a position and attention/gaze of an individual viewing exhibit(s) in a space, to predict a next exhibit the individual focuses on, based on past or current tracked viewing patterns of the individual, and at what time delay, and to communicate this information to at least the plurality of exhibit controller(s) and interactive element(s).

Embodiments in accordance with the present invention provide methods and devices for implementing gaze contingent interactive exhibits, enhanced preservation capability while maintaining patron experience within an exhibit space, and providing for dynamic exhibit permissions for different patrons. The present invention further enables integration of theft/security systems, prevention of unauthorized duplication and recording, and enabling enhanced thematic group experiences by employing room interactive elements.

Embodiments in accordance with the present invention provide methods and devices for implementing "smart room" technology for occupant monitoring in conjunction with liquid crystal display (LCD) glass technology to reduce artifact/object exposure. Artifacts/objects on display are protected from damage sources by LCD glass screens that are opaque when a cognitive room management system detects no one is looking at the object in question or when other limiting conditions occur. Moreover, implementing a sub-human detection opacity duty cycle can reduce long-term exposure and leverage human "persistence of vision" effects depending on an illumination source. Integration with theft and/or security systems to confound theft can also be enabled. Further, "Group Pay" options to display features that are enabled for select patrons (pay to see select objects) can also be enabled for enhanced thematic group experiences, where schools or other groups wish to focus solely on specific materials and subjects as they are lead through exhibits.

Embodiments in accordance with the present invention provide methods and devices for employing the smart room tracking system to enable and optimize Internet of Things (IoT) applications.

The Internet of Things (IoT) enables advanced connectivity of computing and embedded devices through internet infrastructure. IoT involves machine-to-machine communications (M2M), where it is important to continuously monitor connected machines to detect any anomaly or bug, and resolve them quickly to minimize downtime. Logging is a commonly used mechanism to record machines' behaviors and various states for maintenance and troubleshooting. Logs provide a continuous snapshot of the system behaviors and by analyzing log contents, any activity of interest can be troubleshooted.

IoT is an advanced automation and analytics system which exploits networking, sensing, big data, and artificial intelligence technology to deliver complete systems for a product or service. These systems allow greater transparency, control, and performance when applied to any industry or system.

IoT systems have applications across industries through their unique flexibility and ability to be suitable in any environment. IoT systems enhance data collection, automation, operations, and much more through smart devices and powerful enabling technology. IoT systems allow users to achieve deeper automation, analysis, and integration within a system. IoT systems improve the reach of these areas and their accuracy. IoT utilizes existing and emerging technology for sensing, networking, and robotics. Features of IoT include artificial intelligence, connectivity, sensors, active engagement, and small device use. In various exemplary embodiments, the data processing systems of the present invention can be incorporated into a variety of different IoT devices and/or IoT systems.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Referring now to the drawings in which like numerals represent the same or similar elements and initially to FIG. 1, a smart room tracking system coupled with a plurality of exhibit controllers is presented, in accordance with an embodiment of the present invention.

An area 120 can be monitored by one or more imaging devices such as cameras 112 (or image capture devices). The image capture devices 112 can be sensors or any other type of image capture device. Area 120 can be any physical space for which it is desired to monitor a movement of one or more objects therein. For example, area 120 can be a floor area within a building or facility, such as a store, museum, government office, university, etc. Area 120 can also correspond to an outdoor venue, such as a public park, road, street corner, etc. In the exemplary embodiments, the area 120 is a space or room within a museum or university or other institution holding artifacts or cultural objects.

Within area 120, one or more objects of interest can be monitored. In some embodiments, an object of interest can be an object, such a person or patron, for which information is sought about the object's motion, orientation, posture, and eye movement (or gaze) within the area 120. For example, as depicted in FIG. 1, an object of interest can be a person 130 walking through or within area 120, which can correspond to an exhibit within a museum.

In one embodiment, person 130 can approach an exhibit or display case 140. The display case 140 holds therein an object or item or artifact 150. The display case 140 can include a base section and an upper glass section for allowing person 130 to view the artifact 150. Display case 140 can be associated with an exhibit controller 161 mounted or integrated thereto.

A second person 132 can approach an exhibit or display case 142. The display case 142 holds therein an object or item or artifact 152. The display case 142 can include a base section and an upper glass section for allowing person 132 to view the artifact 152. Display case 142 can be associated with an exhibit controller 163 mounted or integrated thereto.

A third person 134 can approach an exhibit or display case 144. The display case 144 holds therein an object or item or artifact 154. The display case 144 can include a base section and an upper glass section for allowing person 134 to view the artifact 154. Display case 144 can be associated with an exhibit controller 165 mounted or integrated thereto.

A fourth person 136 can approach an exhibit or display case 146. The display case 146 holds therein an object or item or artifact 156. The display case 146 can include a base section and an upper glass section for allowing person 136 to view the artifact 156. Display case 146 can be associated with an exhibit controller 167 mounted or integrated thereto.

A display case 148 is also shown holding therein an object 158. The display case 148 can include a base section and an upper glass section. Display case 148 can be associated with an exhibit controller 169 mounted or integrated thereto. No person is within the vicinity of display case 148 and no person is directly viewing object 158. Therefore, the upper glass section transforms into an opaque state or non-transparent state. The non-transparent state can also be referred to as a hazy or blurry or cloudy or misty state that renders the object therein non-viewable to the naked eye. In other words, the object 158 cannot be viewed and is protected from various harmful environmental conditions.

Sensors or cameras 112 can be components of a larger computing system 110 that also includes one or more data stores 114, one or more processing servers 116, and one or more client devices 118. Data stores 114 can be used for storing raw video data received from one or more cameras 112 and/or data records reflecting analysis of the video data. Processing servers 116 can be used to mine and analyze the video data and/or data records stored in data store 114. Client devices 118 can enable human operators to interface with system 110 for the purpose of configuring system 110, specifying criteria for video analysis, viewing the results of video analysis, etc. Those skilled in the art will appreciate that the components of system 110 are exemplary only, and that any suitable system of devices can be used to perform the disclosed embodiments.

In an alternative embodiment, there can be a universal exhibit controller 160, either as a standalone unit, or mounted on a surface, such as a wall, that can automatically and in real-time, control the viewability of each of the objects 150, 152, 154, 156, 158. Therefore, the universal exhibit controller 160 can take the place of exhibit controllers 161, 163, 165, 167, 169. The exhibit controllers 160, 161, 163, 165, 167, 169 control a viewability state of the objects. In other words, the exhibit controllers 160, 161, 163, 165, 167, 169 control whether the glass enclosures are in an opaque state 170 or in a clear state where such objects are viewable by the naked eye. The glass enclosures can be, e.g., semi-transparent displays or shutter-synchronized displays.

The benefits of the smart room system 110 include at least reduced object exposure due to damaging environmental elements or conditions, minimized impact on viewer experience, and an opportunity for unbiased user feedback based on customized viewing logs described below.

Figure 2:
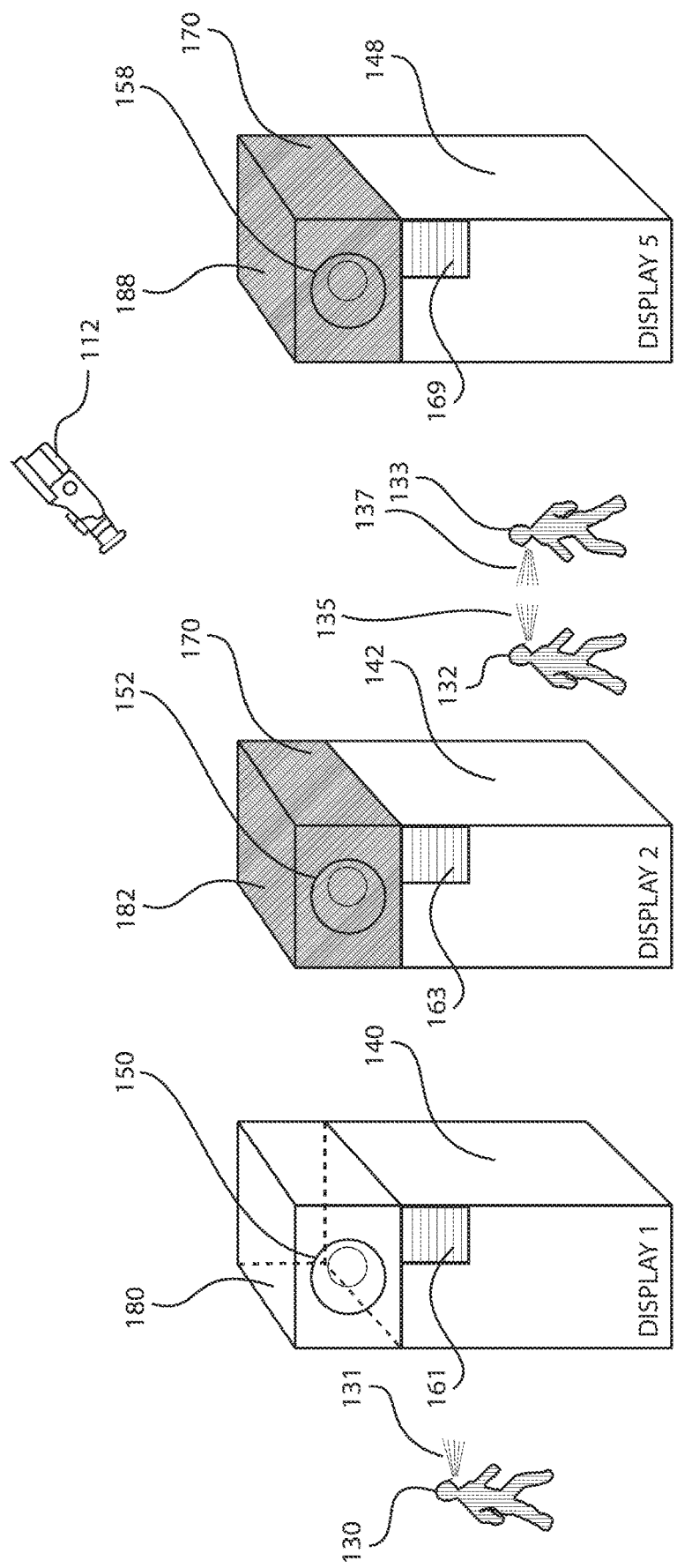
FIG. 2 illustrates exemplary exhibit controllers engaging in preservation mode, in accordance with an embodiment of the present invention.

FIG. 2 illustrates exemplary exhibit controllers engaging in preservation mode, in accordance with an embodiment of the present invention.

The first display case 140 includes an artifact 150 encased within a glass enclosure 180. A person 130 can view the artifact 150. The person 130 has a direct view 131 of the artifact 150. In other words, the eyes, gaze, posture, and orientation of the person 130 are tracked by the camera 112 and it is determined and confirmed that the eyes or gaze of the person 130 are/is indeed directly viewing the artifact 150. If such determinations is made, the artifact 150 is viewable to the person 130. For example, the glass case 180 is in a clear or transparent state.

The second display 142 includes an artifact 152 encased within a glass enclosure 182. It is determined that two people 132, 133 are within the vicinity of the second display 142. However, the first person 132 makes eye contact 135 with the second person 137, and the second person 133 makes eye contact 137 with the first person 132. In other words, the first and second people 132, 133 appear to be talking to each other and not viewing or looking directly at the artifact 152. The eyes, gaze, posture, and orientation of the first and second people 132, 133 are tracked by the camera 112 and it is determined and confirmed that the eyes of the first and second people 132, 133 are indeed not directly viewing the artifact 152. If such determination is made, the artifact 152 is not viewable to the first and second people 132, 133. For example, the glass case 182 is in an opaque state 170. The opaque state can be triggered by the exhibit controller 163. The opaque state 170 protects the artifact 152 from harmful environmental conditions, such as light.

There are three types of light: ultraviolet (UV) light, infrared radiation and visible light. All three types are harmful to artifacts and the damage caused by all light is cumulative and irreversible. In fact, displaying an object under ideal museum lighting conditions for just a few weeks could have the same effects as exposing it to bright sunlight for a day or two.

Exposure to light in all forms causes a chemical reaction to happen within the molecular level of an artifact. Light exposure can cause textiles to weaken and fade, dyes and paints to darken or change color, and paper to become weak, bleached, yellowed or darkened. The best preservation practice would be to house all artifacts in complete darkness. Although the exhibition needs of museums will not allow for that, museums can take several steps to reduce the harmful effects of light as disclosed herein. Because ultraviolet (UV) light is the most harmful type of light, every effort should be made to exclude or filter UV sources.

The most common sources of UV are natural daylight and fluorescent lamps, but tungsten-halogen lamps and high density discharge (HID) lamps also give off significant levels of UV radiation. Sources of natural light should be eliminated from all museum exhibit and storage areas when possible, or filtered when elimination is not possible.

The fifth display 148 includes an artifact 158 encased within a glass enclosure 188. It is determined that no people are within the vicinity of the fifth display 148. The camera 112 can determine that no one is within the vicinity of the fifth display 148 and that no direct eye contact is being made with the artifact 158. If such determination is made, the artifact 158 is not viewable. For example, the glass case 188 is in an opaque state 170. The opaque state 170 protects the artifact 158 from harmful environmental conditions, such as light. The opaque state can be triggered by the exhibit controller 169. The opaque state 170 can be temporarily removed once a person approaches the display case 148 and makes direct eye contact with the artifact 158.

Therefore, individual user interests are tracked at the "by object" level in a gallery or museum setting. In other words, the cameras 112 can track an individual from one room to another within the entire museum setting and determine exactly how many objects the individual has viewed and for how long. Additionally, exhibit controllers can be employed to allow or disallow viewability of one or more objects/artifacts. This will be further discussed below.

Figure 3:
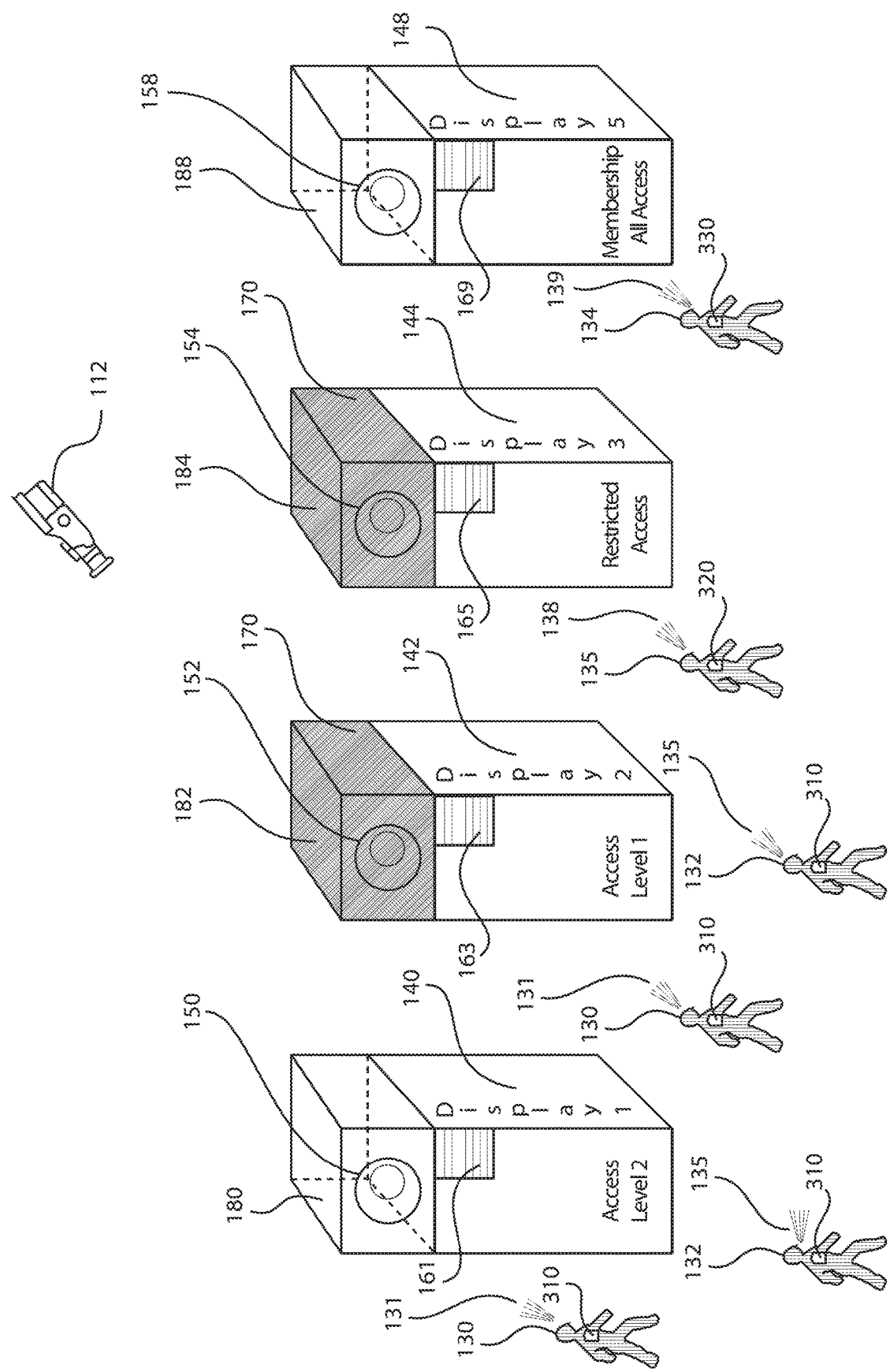
FIG. 3 illustrates exemplary dynamic exhibit permissions, in accordance with an embodiment of the present invention.

FIG. 3 illustrates exemplary dynamic exhibit permissions, in accordance with an embodiment of the present invention.

The first display case 140 includes an artifact 150 encased within a glass enclosure 180. A first person 130 having a first badge 310 and a second person 132 having a first badge 310 are shown within the vicinity of the first display case 140. The first person 130 and the second person 132 are viewing the artifact 150. The person 130 has a direct view 131 of the artifact 150 and the second person 132 also has a direct view 135 of the artifact 150. In other words, the eyes, gaze, posture, and orientation of the first person 130 and the eyes, gaze, posture, and orientation of the second person 132 are tracked by the camera 112 and it is determined and confirmed that the eyes of the first person 130 and the second person 132 are indeed directly viewing the artifact 150. If such determinations is made, the artifact 150 is viewable to the first person 130 and the second person 132. For example, the glass case 180 is in a clear or transparent state.

However, the display case 140 has been designated as a "Level 2" access. "Level 2" can refer to the status or access privileges assigned to a person or patron. In one instance, "Level 2" can be designated based on payment made at entrance to the museum. "Level 2" can be, e.g., associated with payment of a basic fee or general admission fee to view a certain number of exhibits or a certain type of exhibits. Of course, one skilled in the art can contemplate associating the access indicator "Level 2" with any other parameter, not just a fee parameter. Since display case 140 is a "Level 2" display case, and since the first and second people 130, 132 have been determined to have at least such access levels, based on the badge 310 worn by both, both persons 130, 132 are permitted and authorized to view artifact 150.

The second display case 142 includes an artifact 152 encased within a glass enclosure 182. A first person 130 having a first badge 310 and a second person 132 having a first badge 310 are shown within the vicinity of the second display case 142. The first person 130 and the second person 132 are attempting to view the artifact 152. The person 130 has a direct view 131 of the artifact 152 and the second person 132 also has a direct view 135 of the artifact 152. In other words, the eyes, gaze, posture, and orientation of the first person 130 and the eyes, gaze, posture, and orientation of the second person 132 are tracked by the camera 112 and it is determined and confirmed that the eyes of the first person 130 and the second person 132 are indeed directly viewing the artifact 152. If such determinations is made, the smart room tracking system also detects badges 310 worn by the first and second people 130, 132.

The smart room tracking system determines that the badge 310 of the first person 130 is a "Level 2" access badge, whereas the badge 310 of the second person 132 is a "Level 1" access badge. The display case 142 has been designated as a "Level 1" access. In one instance, "Level 1" can be designated based on payment made at entrance to the museum. "Level 1" can be, e.g., associated with payment of a higher fee (general admission plus certain special exhibits) to view a certain number of exhibits or a certain type of exhibits. Of course, one skilled in the art can contemplate associating the access indicator "Level 1" with any other parameter, not just a fee parameter. Since display case 142 is a "Level 1" display case, and since the first person 130 has a "Level 2" access (i.e., inferior to "Level 1"), the artifact 152 is not viewable to the first person 130. For example, the glass case 182 is in a non-transparent or opaque state 170. However, the second person 132 who has a "Level 1" access can view the exhibit through either special exhibit glasses or special headphones provided to such second person 132, as will be further described below with reference to FIG. 4.

Therefore, allowance or non-allowance of viewing of artifacts can be based on exhibit permissions conferred to patrons upon entry to the museum. Permissions can be based on a multitude of factors, such as different admission fees, age restrictions, group restrictions, exhibit restrictions, etc.

The third display case 144 includes an artifact 154 encased within a glass enclosure 184. A person 135 having a second badge 320 is shown within the vicinity of the third display case 144. The person 135 attempts to view the artifact 154. The person 135 has a direct view 138 of the artifact 154. In other words, the eyes, gaze, posture, and orientation of the person 135 are tracked by the camera 112 and it is determined and confirmed that the eyes of the person 135 are indeed directly viewing the artifact 154. If such determinations is made, the smart room tracking system further detects badge 320 worn by the person 135.

The smart room tracking system determines that the badge 320 of the person 135 is a "Level 3" access badge, or a restricted access badge. The third display case 144 is a restricted access display case. For example, the artifact 154 can be a vase depicting naked athletes in the ancient Olympics. This subject matter may be inappropriate or objectionable for certain individuals. As such, artifact 154 can only be viewed by patrons that are at least, say, 18 years of age. Since person 135 has a restricted badge (e.g., due to age), the artifact 154 is not viewable to the person 135. For example, the glass case 184 is in a non-transparent or opaque state 170 to block viewing of the artifact 154. The opaque state can be triggered by the exhibit controller 165.

Therefore, allowance or non-allowance of viewing of artifacts can be based on exhibit permissions conferred to patrons upon entry to the museum. Permissions can be based on a multitude of factors, such as restrictions due to age and/or subject matter.

The fifth display case 148 includes an artifact 158 encased within a glass enclosure 188. A person 134 having a third badge 330 is shown within the vicinity of the fifth display case 148. The person 134 attempts to view the artifact 158. The person 134 has a direct view 139 of the artifact 158. In other words, the eyes, gaze, posture, and orientation of the person 134 are tracked by the camera 112 and it is determined and confirmed that the eyes of the person 134 are indeed directly viewing the artifact 158. If such determinations is made, the smart room tracking system further detects badge 330 worn by the person 134.

The smart room tracking system determines that the badge 330 of the person 134 is a "All Access" access badge. The fifth display case 148 is an all access membership display case. Since person 134 has an all access badge 330, the artifact 158 is viewable to the person 134. For example, the glass case 188 is in a clear state that allows viewing of the artifact 158. The 'All access" badge may be combined with exhibit glasses or exhibit headphones to be viewable to the persons 134, as described below with reference to FIG. 4.

Therefore, allowance or non-allowance of viewing of artifacts can be based on exhibit permissions conferred to patrons upon entry to the museum. Permissions can be based on a multitude of factors, such as all access memberships to VIP members.

Figure 4:
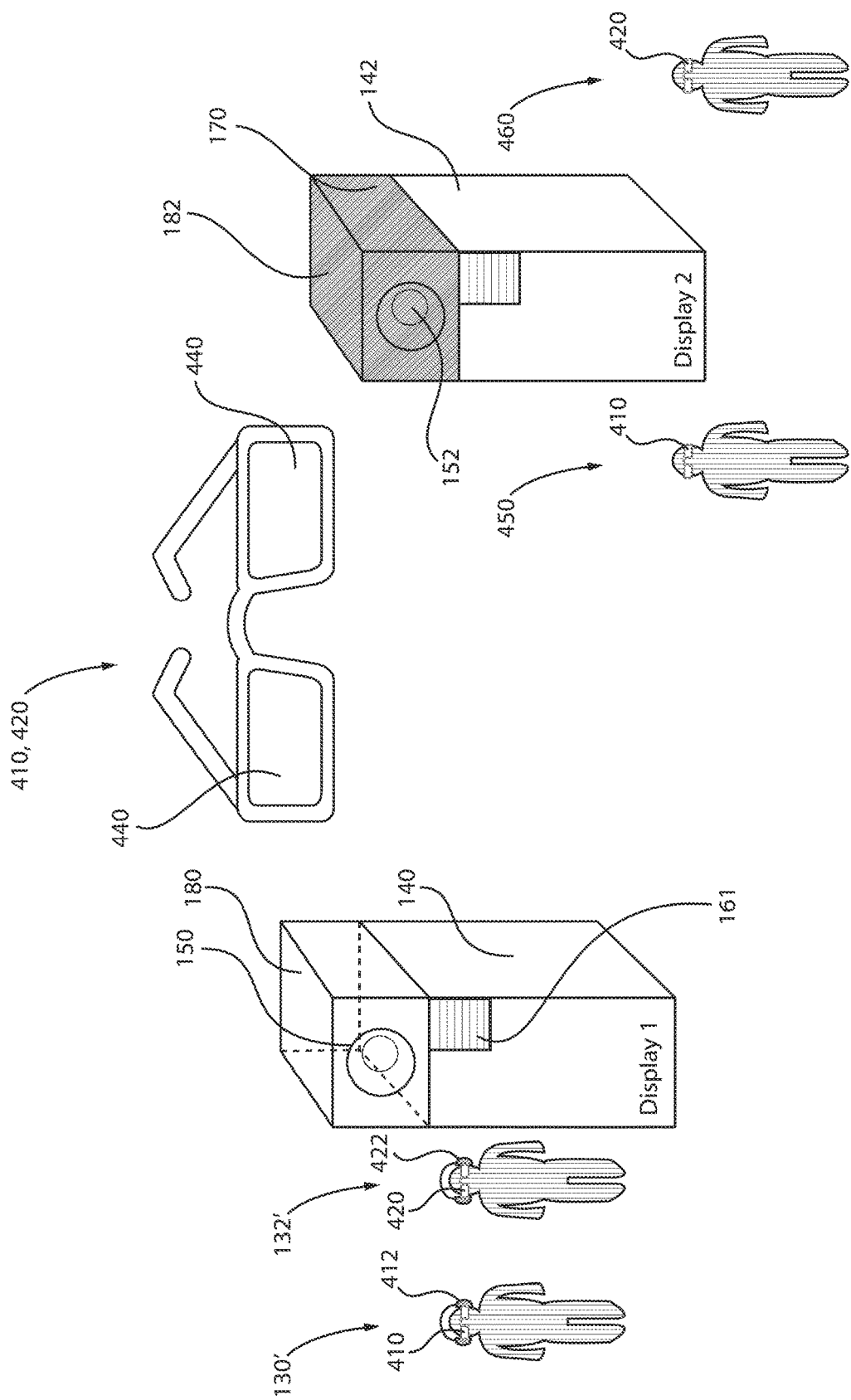
FIG. 4 illustrates exemplary interactive elements activated based on information received from the smart room tracker, in accordance with an embodiment of the present invention.

FIG. 4 illustrates exemplary interactive elements activated based on information received from the smart room tracker, in accordance with an embodiment of the present invention.

The first display case 140 includes an artifact 150 encased within a glass enclosure 180. A first person 130' has exhibit glasses 410 and headphones 412 and is in the vicinity of the first display case 140. A second person 132' has exhibit glasses 420 and headphones 422 and is in the vicinity of the first display case 140. The first person 130' and the second person 132' are viewing the artifact 150. The person 130' has a direct view of the artifact 150 and the second person 132' also has a direct view of the artifact 150.

The exhibit glasses 410, 420 and headphones 412, 422 can be referred to as interactive elements. The interactive elements can be activated based on information from the smart room tracker. The exhibit glasses 410, 420 can be liquid crystal display (LCD) shutter glasses or shutter synchronized or active shutter glasses having special lens 440. The exhibit glasses 410, 420 can be activated, e.g., when people 130', 132' have permission to view certain types of artifacts or exhibits. Similarly, headphones 412, 422 can be activated in tandem with the exhibit glasses 410, 412 when people 130', 132' have permission to view certain types of artifacts or exhibits. The headphones 412, 422 can provide targeted commentary on a specific artifact or exhibit. The headphones 412, 422 can further provide for different commentary based on the individual wearing the headphones 412, 422. For example, if a child is wearing headphones 422, then the child can receive different commentary than the adult wearing headphones 412.

In the instance case, both people 130', 132' can view the artifact 150. For example, the glass case 180 is in a clear or transparent state. This is because the smart room tracking system has determined that both people 130', 132' have permission to view such artifact 150.

The second display case 142 includes an artifact 152 encased within a glass enclosure 182. A first person 450 has exhibit glasses 410 and is in the vicinity of the second display case 142. A second person 460 has exhibit glasses 420 and is in the vicinity of the second display case 142. The first person 450 and the second person 460 are attempting to view the artifact 152. The person 450 has a direct view of the artifact 152 and the second person 460 also has a direct view of the artifact 152. However, the artifact 152 is not viewable by both persons 450, 460. The artifact 152 can be viewable by person 450 only. Thus, the exhibit glasses 410 of the person 450 are activated to enable such viewing by the person 450. The person 460, however, cannot view such artifact 152 and the glass enclosure 182 remains in an opaque state 170. Thus, the exhibit glasses 420 of person 460 are not activated. This can be due to several factors. For example, there can be an age restriction associated with the artifact 152. In another example, the fee paid by person 450 may not cover the artifact 152 because the artifact can be part of a larger exhibit that is only viewable by VIP members. Therefore, the exhibit glasses 410, 420 can be activated for certain persons only based on a number of different access requirements or privileges.

Figure 5:
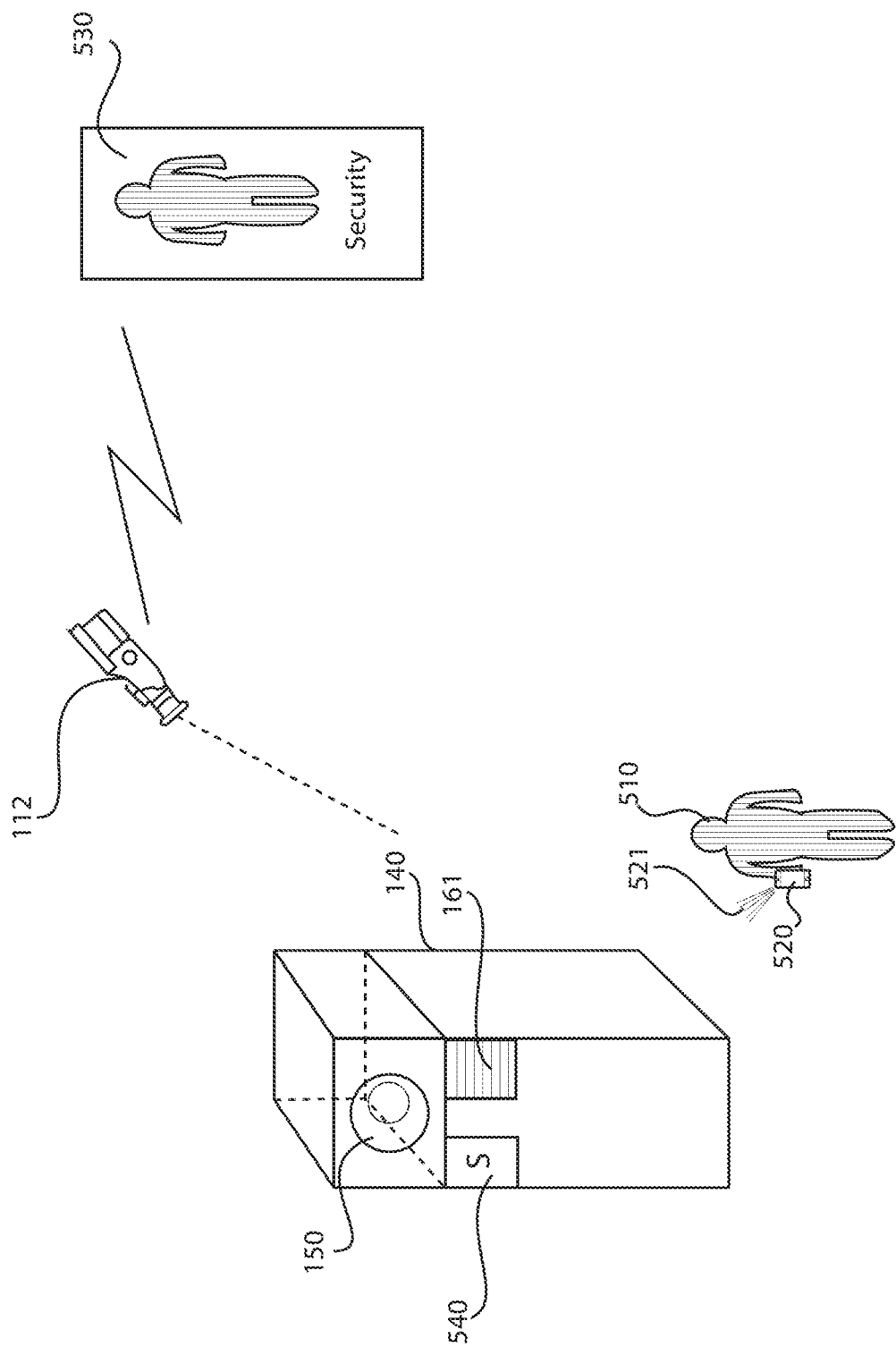
FIG. 5 illustrates an exemplary unauthorized duplication and recording protection system, in accordance with an embodiment of the present invention.

FIG. 5 illustrates an exemplary unauthorized duplication and recording protection system, in accordance with an embodiment of the present invention.

In various exemplary embodiments, the first display 140 can include artifact 150 therein. The display 140 can further include a security system 540. If a person 510 holding an electronic device 520 including a recording capability 521 approaches the first display 140 and attempts to record or take a photo 521 of the artifact 150, the camera 112 can detect such activity and report such activity, automatically and in real-time, to security personnel 530. Security personnel 530 can be summoned to apprehend the person 510. Therefore, unauthorized duplication and recording can be quickly averted.

Figure 6:
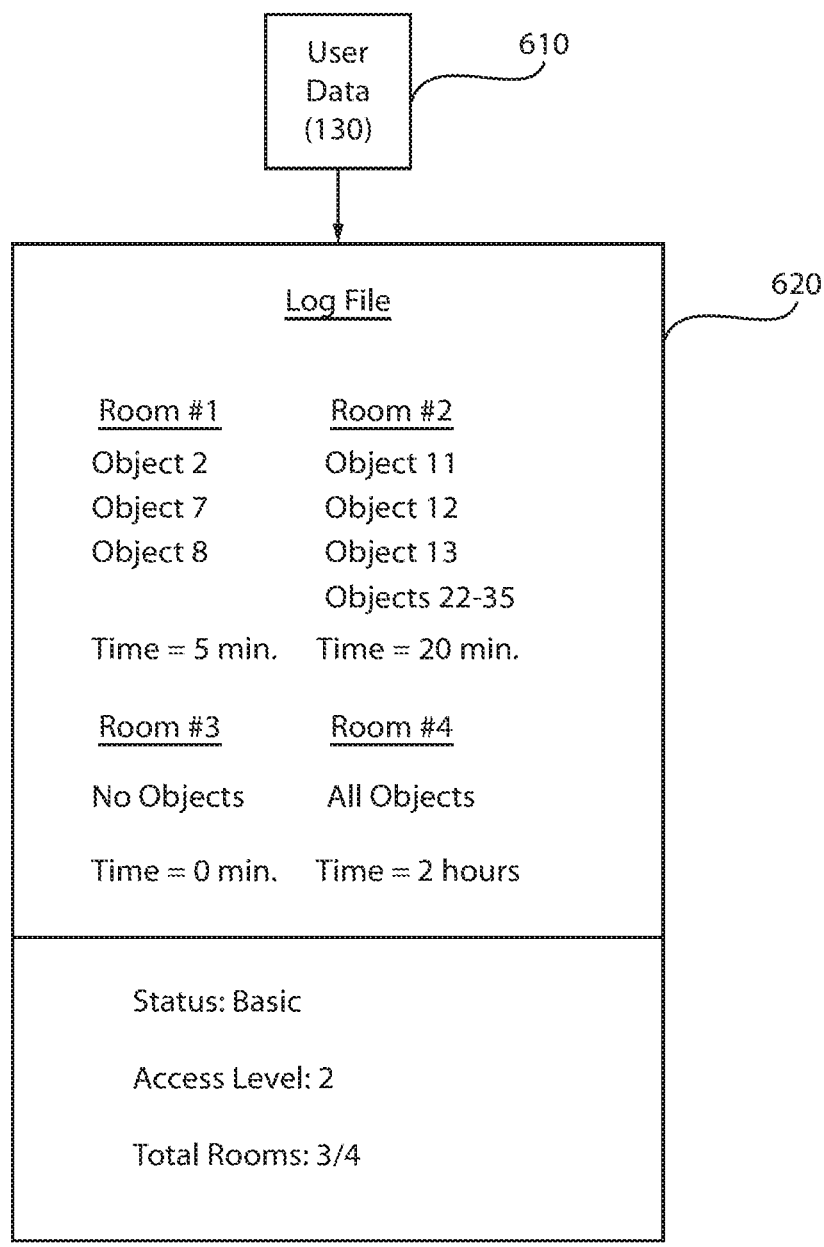
FIG. 6 illustrates an exemplary user log file derived from a user's visit in a museum, in accordance with an embodiment of the present invention.

FIG. 6 illustrates an exemplary user log file derived from a user's visit in a museum, in accordance with an embodiment of the present invention.

In various exemplary embodiments, a log file 620 can be created for each and every patron or person visiting the museum or building or facility. User data 610 can be collected by the cameras 112 located within the entire museum. The user data 610 can be broken down by individual. As such, a customized log file 620 can be created for each and every individual. For example, log file of individual 130 can be created and include the following data.

The individual 130 entered a first room in the museum. The individual 130 viewed artifacts or objects 2, 7, 8. The first room can have therein 10 total objects. Thus, it is determined that the individual 130 viewed 3 out of 10 objects. The individual 130 spent a total of 5 minutes viewing the 3 objects. The individual spent 1 minute viewing object 2, 1 minute viewing object 7, and 3 minutes viewing object 8. Various conclusions can be drawn from such viewing habits of individual 130 in the first room. For example, it appears that individual 130 did not particularly have an interest for the objects in this first room. The individual only spent 5 minutes total in the first room.

This data related to individual 130 can be compared to other viewing habits of other individuals viewing the objects in the first room. In one example, from historical data collected over the past month, 220 individuals entered the first room. The average time spent by the 220 individuals within the first room was 45 minutes. The average time spent viewing the first object was 5 minutes. The average time spent viewing the second object was 10 minutes. The average time spent viewing the third object was 5 minutes. The average time spent viewing the fourth item was 15 minutes. The average time spent viewing the fifth object was 2 minutes. Therefore, compared to 220 other individuals who entered the first room over the past month, individual 130 spent a significantly less amount of time viewing such objects. Various conclusions can be drawn by such viewing habits. For example, the individual 130 may have had a "Level 2" status or "basic" status or a "restricted" status, and half the objects within the first room may have been only viewable to individuals having a "Level 1" status. Thus, it makes sense that individual 130 only spent 5 minutes total in the first room compared to other individuals who spent an average of 45 minutes in the first room.

The log file 620 reveals further information regarding individual 130.

The individual 130 entered a second room in the museum. The individual 130 viewed artifacts or objects 11, 12, 13, and 22-35. The second room may have included 35 total objects. Thus, it is determined that the individual 130 viewed 16 out of 35 objects. The individual 130 spent a total of 20 minutes viewing the 16 objects. The individual spent 2 minutes viewing object 11, 2 minutes viewing object 12, 3 minutes viewing object 13, and 13 minutes viewing objected 22-35. Various conclusions can be drawn from such viewing habits of individual 130 in the second room. For example, it appears that individual 130 did have an interest for the objects in this second room.

This data related to individual 130 can be compared to other viewing habits of other individuals viewing the objects in the second room. In one example, from historical data collected over the past month, 150 individuals entered the second room. The average time spent by the 150 individuals within the second room was 25 minutes. The average time spent viewing the first object was 2 minutes. The average time spent viewing the second object was 2 minutes. The average time spent viewing the third object was 1 minute. The average time spent viewing each of items 11, 12, 13 was 2 minutes. The average time spent viewing the objects 22-35 was 15 minutes. Therefore, compared to 150 other individuals who entered the second room over the past month, individual 130 spent about the same amount of time viewing such objects.

The log file 620 reveals further information regarding individual 130.

The individual 130 did not enter the third room and thus did not view any objects within the third room. The individual 130 did enter the fourth room and viewed all the exhibits and/or objected for approximately 2 hours. Various conclusions can be drawn by such viewing habits. Obviously, individual 130 had a keen interest of the artifacts in the fourth room and absolutely no interest in the objects of the third room. Maybe the individual 130 is a student on a field trip and had to write a paper for class related to the objects in the fourth room. As such, it makes sense that individual 130 allocated 2 hours to the fourth room. Such determination (that this is a student) can be made upon entrance to the museum. Additionally, the log file 620 provides the status of the individual 130, access level of individual 130, and total number of rooms viewed in relation to the total amount of rooms. The museum can collect this data and store it in a database to determine which rooms or exhibits or artifacts are popular and which have the most or least foot traffic. This data can be used to control viewing of artifacts and/or exhibits and/or viewing times and/or foot traffic.

For example, a comparison can be made regarding average time spent within each room in a museum for different periods of time. Between, e.g., Jun. 1, 2017 and Jun. 15, 2017, the first room had an average viewing time of 45 minutes, the second room had an average viewing time of 25 minutes, the third room had an average viewing time of 1 hour, and the fourth room had an average viewing time of 1 hour. The first room had the most foot traffic between 9:00 am to 11:00 am. The second room had the most foot traffic 10:00 am to 11:30 am. The third room had foot traffic between 2 pm and 5 pm. The fourth room had the most foot traffic between 1 pm and 4 pm. The museum can store customized log files for each individual entering the museum and use this data, partially or fully, for modifying or revising one or more factors or viewing policies or viewing requirements.

For instance, if an exhibit requiring "Level 1" access is not getting enough foot traffic, the museum can determine that the status of such exhibit change to "Level 2" to allow individuals with basic admission to view such objects within such exhibit.

If an object is getting too much foot traffic, e.g., every 10-15 second there is another individual viewing such object, and this goes on for hours, then the museum can collect such data and use it to determine that such object should only have a 2-hour viewing time early in the morning or that only individuals having exhibit glasses or can view such object. Therefore, updates to viewing polices can be continuously made on a daily basis based on foot traffic.

Figure 7:
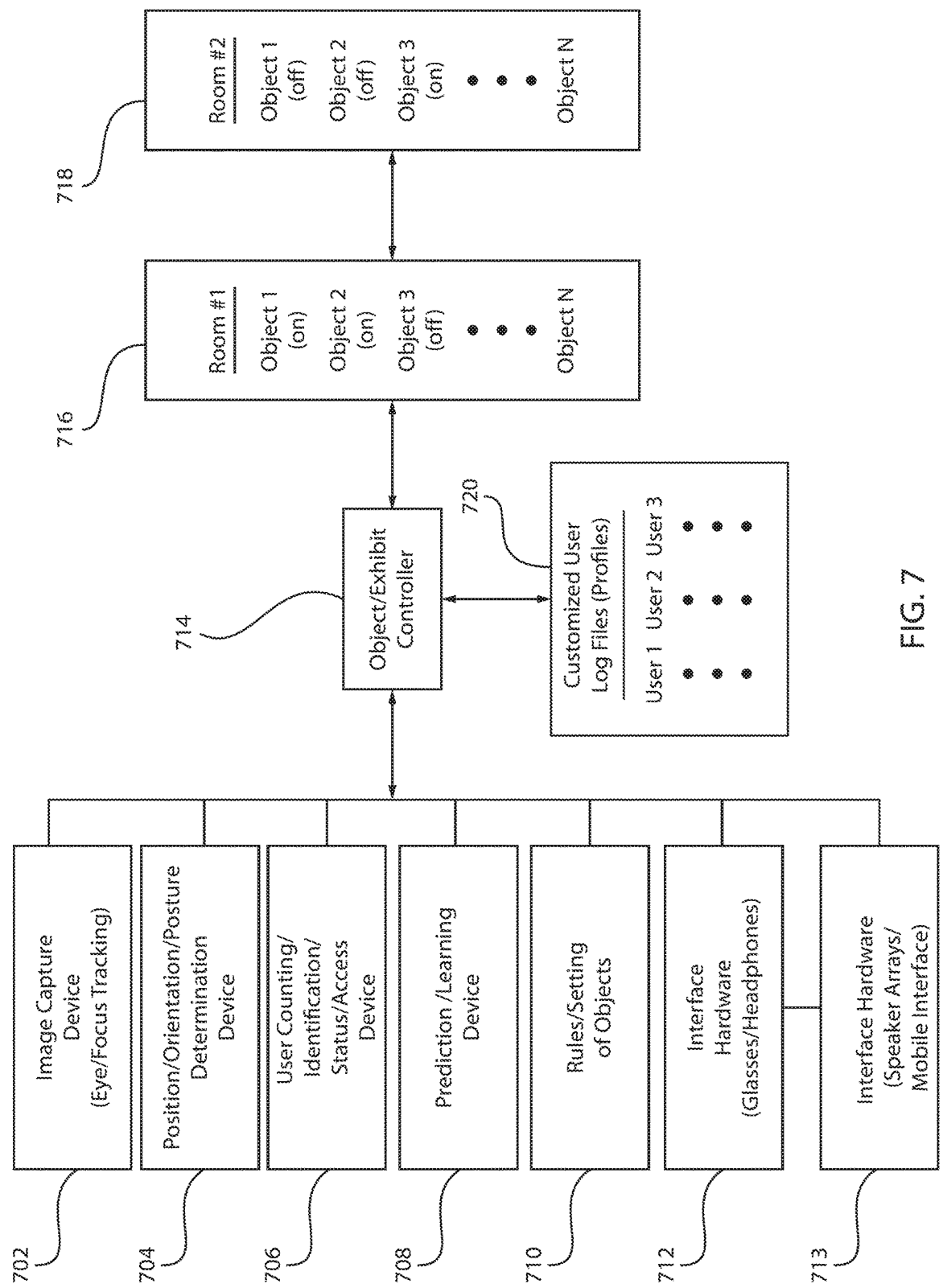
FIG. 7 illustrates an exemplary smart display and control system, in accordance with an embodiment of the present invention.

FIG. 7 illustrates an exemplary smart display and control system, in accordance with an embodiment of the present invention.

The smart display and control system can include an image capture device 702. The image capture device 702 can have eye tracking and focus tracking capabilities. Eye tracking is the process of measuring either the point of gaze (where a person is looking) or the motion of an eye relative to the head. An eye tracker is a device for measuring eye positions and eye movement. There are a number of methods for measuring eye movement. The most popular variant uses video images from which the eye position is extracted. Eye-trackers measure rotations of the eye in one of several ways, one being by optical tracking.

In optical tracking methods, light, usually infrared, is reflected from the eye and sensed by a video camera 112 or some other specially designed optical sensor. The information is then analyzed to extract eye rotation from changes in reflections. Video-based eye trackers usually employ a corneal reflection (the first Purkinje image) and a center of the pupil as features to track over time. A more sensitive type of eye-tracker, the dual-Purkinje eye tracker employs reflections from the front of the cornea (first Purkinje image) and the back of the lens (fourth Purkinje image) as features to track.

The most widely used designs employed are video-based eye-trackers. A camera focuses on one or both eyes and records eye movement as the viewer looks at some kind of stimulus. Most modern eye-trackers use the center of the pupil and infrared/near-infrared non-collimated light to create corneal reflections (CR). The vector between the pupil center and the corneal reflections can be used to compute the point of regard on surface or the gaze direction. A simple calibration procedure of the individual is usually needed before using the eye tracker.

The smart display and control system can include a position and/or orientation and/or posture determination device 704. Such determination device 704 detects a position of the individual in the museum and with respect to display cases. Additionally, an orientation and posture of the individual is determined. It is determined if the individual is facing the display case or if the individual is bent over trying to tie his/her shoelaces, etc. The data from the determination device 704 can be used in conjunction with other data to determine whether to make artifacts viewable or not via the exhibit controllers described above.

The smart display and control system can include a user counting, user identification, user status, and user access device 706. Device 706 can keep count of the number of individuals entering a museum, entering each room in the museum, and viewing each object or artifact within in each room in a museum. Device 706 can, e.g., count that 200 individuals viewed object or artifact 7 in room 6. Device 706 can also identify individuals, determine their status, and determine their access or privilege level. For example, each individual can have a badge which continuously communicates information to exhibit controllers or cameras within each of the rooms.

The smart display and control system can include a prediction or learning device 708. The device 708 can predict, based on an individual's movements within the museum and based on specific artifacts viewed so far, whether an individual will enter other rooms or view other exhibits or other artifacts. For example, if within the first 45 minutes, an individual viewed Egyptian artifacts within the second and third rooms, device 708 can predict that such individual is highly likely to enter room 14, on the third floor, to view artifacts 1-10, which also relate to Egyptian artifacts. Therefore, based on specific object or artifact viewing of patron 1, device 708 can predict that patron 1 will likely view specific other artifacts within the museum. The device 708 can also predict how long an individual will spend within one or more rooms or within one floor of the museum or within the entire museum. For example, if patron 2 spent 10 minutes in the $2^{nd}$ room, 10 minutes in the $3^{rd}$ room, 5 minutes in the $5^{th}$ room, it is highly likely that patron 2 will not spend much time on other exhibits or will probably head to the cafeteria for further enlightenment. Therefore, predictions can be made as to what objects a patron will attempt to see and predictions can be made as to how long the patron will view further objects within the facility or building or museum based on past or current tracked viewing patterns of the individual. Additionally, a time delay can be predicted between currently viewed objects and future objects to be potentially viewed. For example, it can be predicted that an individual viewing object 2 in room 3 will potentially view objects 5-10 in room 4, including similar subject matter, and located next to room 3, in about, e.g., 12-13 minutes. The time delay can be based on, e.g., a distance between object 2 in room 3 and objects 5-10 in room 4, as well as an age of the individual, mobility of the individual, etc. Several factors or variables can be considered when making a time delay prediction.

The smart display and control system can include a rules/settings of objects device 710. Device 710 can be controlled to include a plurality of different rules or setting designated by one or more, e.g., museum officials.

The smart display and control system can include interface hardware 712, 713. Interface hardware 712 can be, e.g., exhibit glasses or exhibit headphones, whereas interface hardware 713 can be, e.g., mobile device or speaker arrays. One skilled in the art can contemplate providing patrons of a museum any type of interface hardware to interact with the exhibits and/or artifacts/objects within the exhibits. The speaker arrays can be a targeted sound system or addressable radio broadcast to individual headphones designed to beam audio to narrow focal points where each person gets his/her own audio track.

The smart display and control system can include an object or exhibit controller 714 that communicates with devices 702, 704, 706, 708, 710, 712, 713. The object controller 714 can control the viewing status of the objects within a museum. In other words, the object controller 714 can activate or deactivate the glass enclosures for viewing purposes based on data received from sensor or cameras or image capture devices 112. The glass enclosures can be dimmed or converted to an opaque state in accordance thereof. In one example, the glass enclosures can be, e.g., semi-transparent displays or shutter-synchronized displays.

The smart display and control system can include hardware and software for creating customized user viewability profiles 720 for each individual or patron entering and moving about the museum. The customized profile 720 for each patron can at least indicate object viewing characteristics or patterns. In other words, customized user viewability profiles 720 can track and count exactly which objects each patron viewed and for how long each patron viewed each object. Comparisons can also be made to determine viewing patterns of each patron. The customized user profiles 720 can be extracted from data collected from a first room 716, a second room 718, etc. Thus, data collected from cameras 112 located in each room 716, 718 can be employed to create customized user profiles 720. The user or patron profile indicates customized interactivity with objects/artifacts, logs individual visitor history, engagement with objects/artifacts, language preferences, and many other types of profile information.

Therefore, according to FIG. 7, the input parameters of the smart room system are room population, user orientation and posture, patron identification, patron status (access, restrictions, privileges), and system owner rules/settings for objects/artifacts. The source of such input parametres can be, e.g., security systems, cameras, enhanced machine vision systems, audio sensors, mobile device wearable electronics, IoT devices, etc. The input parameters are processed by, e.g., an algorithm. The processing can include at least evaluating the room population for fields of view, comparing the field of view against user status or access or privileges, evaluation of total exposure for each object/artifact, and monitoring for illicit mobile device or recording device use within the vicinity of an object/artifact. The output of the smart room system can include at least individual object LCD glass on/off status and duty cycle, individual object viewing history, and security notification of abnormal or prohibited situations (e.g., camera, recording, theft, tampering, etc.)

Figure 8:
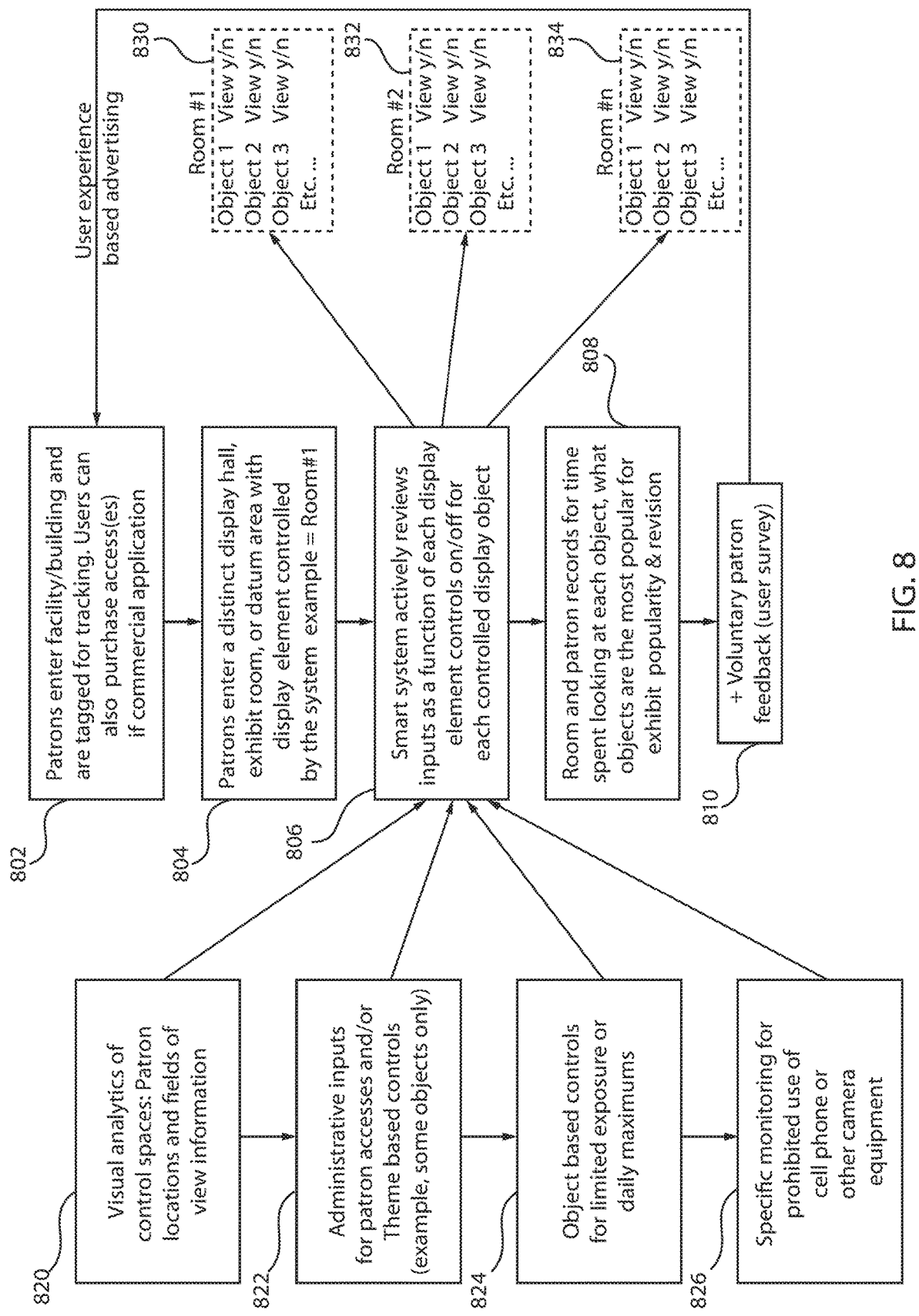
FIG. 8 is a block/flow diagram illustrating an exemplary operational flow, in accordance with an embodiment of the present invention.

FIG. 8 is a block/flow diagram illustrating an exemplary operational flow, in accordance with an embodiment of the present invention.

The operation flow starts at block 802 where patrons enter a facility or building or museum and are tagged for tracking. Patrons can also purchase different types of access or privilege levels. A user can make a purchase for a basic entrance fee or for an enhanced entrance fee or for a restricted entrance fee or for an all-access entrance fee. The patrons can receive different badges based on such purchase, the badges being detected by the sensors or cameras 112 (FIG. 1) to determine on/off capabilities of specific artifacts/objects within the building or facility.

At block 804, patrons can enter a distinct display hall or exhibit including a plurality of different objects or artifacts. Each display case can be controlled by an object controller 714 (FIG. 7). In one example, the exhibit controller 714 can be mounted or incorporated within each of the display cases. In another example, a universal exhibit controller 714 can be attached to any surface, such as a wall within the exhibit to control all of the objects within the exhibit. The movement (as well as direct eye contact, gaze, posture, and body orientation) of patrons within each room can be tracked. The viewing of each patron can also be tracked to determine distance of the patron with respect to each display case (or artifact) and determine if direct eye contact is made with such artifact.

At block 806, the smart room system 110 (FIG. 1) actively reviews inputs as a function of each display element and controls whether such display elements should be viewable to the patrons. If a patron is in close proximity to an artifact and directly views the artifact, and has the appropriate privileges, then such artifact is viewable to the patron. However, if no patrons are within close proximity to an artifact (e.g., 1 foot), then the glass display case of such artifact is changed to an opaque state 170 (FIG. 2). Moreover, if a patron is in close proximity to an artifact, but has his or her back to the artifact, the artifact remains in the opaque state 170 (FIG. 2).

At block 808, movement of the patrons within rooms is tracked. Additionally, eye contact of the patrons with specific objects/artifacts can be tracked. It can be determined which artifacts are the most popular within a room or within an exhibit or on a certain wing of the facility, or on a certain floor of the facility or within the entire facility. The data can be collected into a database and evaluated or processed to allow facility staff or officials or personnel to make changes or revisions to, e.g., viewing times of objects/artifacts. Revisions can be made on a daily basis or weekly basis, etc. The data is collected in real-time and can thus enable personnel to make immediate changes based on demand.

At block 810, patron feedback can be received. This feedback can be voluntary. The feedback can relate to one or more viewed objected/artifacts. Such data can be incorporated into the database to determine, e.g., levels of interest for certain types of objects/artifacts. The feedback can be collected at different points within the facility.

At block 830, data is collected from a first room for each patron. For example, it can be determined whether patron 1 viewed the first object and for how long. It can be determined if patrons 2 and 3 viewed the second object and for how long. It can also be predicted if patron 5, after viewing objected 2, 3, 5, 7, and 9 will view objects 12-25 on the opposite end of the first room. If patron 5 spent 10 minutes on each of objects 2, 3, 5, 7, and 9, then it may be predicted that there is a high likelihood of viewing objects 12-25 that are of related subject matter (and predicted that the viewing will occur within, e.g., 2-3 minutes). However, if patron 5 spends 3 minutes total viewing each of objects 2, 3, 5, 7, and 9, there is a high likelihood that patron 5 will exit the room and try out a different room with different objects. All this information can be continuously communicated in real-time back to at least the exhibit controllers and to the interactive elements.

Similarly, at blocks 832 and 834, data is collected from a second and third rooms, respectively, for each patron entering such rooms. For example, it can be determined whether patron 1 viewed the first object and for how long. Comparisons can be made between patrons, and viewing times, and viewing of specific objects, to extract more data. How long did patron 1 spend in the first room versus the second room? Did all 20 patrons in the first room view the second object? Why did none of the 35 patrons in the third room view the fifth object? Was it a restricted access object? Was it an objectionable object? Was it a "Level 1" access subject and everyone had a "Level 2" access badge? Such questions can be answered by continuously collecting data in real-time, and deciphering the data to predict object viewing patterns.

At block 820, the smart system of block 806 can receive visual analytics of control spaces data. This data relates to patron locations or positions or orientations. This data can determine direct eye contact of each patron with specific objects.

At block 822, the smart system of block 806 can receive administrative inputs for patron accesses and/or theme based control data. For example, some patrons can be on a field trip and are permitted to only view objects within 2 rooms of the facility. The patrons can be students. The teachers may have restricted access of the students to only 2 rooms of the facility so that the students can focus on papers that need to be written on a topic related to artifacts/objects with the 2 rooms. The teachers do not want the students to be distracted by other objects in other rooms (or exhibits). The assigned paper is on Greek mythology and the focus of the 2 rooms is on Greek mythology.

At block 824, certain objects can be programmed to be on for limited exposure or daily maximums. For example, an object that is very sensitive to environmental conditions can be available for viewing only 2 hours a day for 3 days a week. The glass enclosures can be set by facility officials' or personnel to be in an opaque state the remainder of the time, regardless of user access levels or privileges.

At block 826, specific monitoring can take place to prevent or prohibit individuals from taking pictures of objects or recording objects or tampering with the objects in any manner. Security personnel 530 can be immediately notified when any such activity is detected by the cameras 112 (FIG. 5).

In summary, individual user interests and display of artifacts impact can be tracked at the "by object" level in a building or facility, such as, e.g., a museum. A smart room tracking system coupled with an exhibit controller(s) and room interactive element(s) with a patron tiered permissions system is implemented by the exemplary embodiments of the present invention. The smart room tracker is enabled to observe a position and attention/gaze of an individual or patron viewing exhibit(s) in a space. The smart room tracker is enabled to predict a next exhibit the individual or patron will focus on and at what time delay. The smart room tracker is further enabled to communicate this information to the exhibit controller(s) and interactive element(s).

The exhibit controller engages in preservation mode when no "gaze" or "direct" eye contact is on the exhibit. Preservation mode can include low or reduced light, enhanced shielding from the outside environment, etc. The exhibit controller is either pre-configured with viewing settings for the exhibit or can query them from a database (e.g. patron permissions). The exhibit controller can enable ambient lighting, sound, and interactive displays in anticipation of the "gaze" or "direct sight" signal from the smart room tracker.

Moreover, interactive elements can be activated based on information received from the smart room tracker. Interactive elements can include shutter synchronized displays to the "exhibit glasses" of an individual for enabling viewing of contextual content. Interactive elements can also include phased speaker arrays providing targeted commentary on a specific exhibit or object. A phased-speaker array can create a directed beam of sound that can be heard only by one or more targeted patrons based on assigned privileges. Interactive elements can be activated in a green area with higher levels of interactivity based on proximity of the patron to the object. Exhibits in a yellow field of view could be on standby, and exhibits in a gray field of view would not be activated. Therefore, interactive elements can be activated or deactivated based on distance between the patron and the object. Different zones can be created to determine activation verses deactivation.

Moreover, gaze contingent interactive exhibits are provided having enhanced preservation capabilities while maintain a high-level of patron experience in an exhibit space. Also, dynamic exhibit permissions are available, as well as customized tours based on assigned access levels and/or privileges. The present invention protects displayed materials from environmental damage/impact. The present invention further protects displayed materials when not "of focus," that is, when there is no direct gaze or direct eye contact with the displayed materials. Thus, viewing of displayed materials can be fully controlled and limited or restricted based on a number of gaze set rules based on multiple gaze actions detected. The present invention further allows for exhibit glasses and exhibit headphones that can activate the viewing of the displayed materials. The present invention further relates to creating customized user profiles for each and every patron and providing customized responses to each patron based on access levels and privileges, as well as other parameters or variables (e.g., fee, memberships, special access, customized tours, contextual tours, ticketing, etc.). The present invention provides for an immersive, coordinated or customized patron experience that takes specific action based on patron focus/gaze/eye tracking/direct sight concurrently with patron posture and/or patron orientation.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the one or more embodiments, the practical application or technical improvement over technologies found in the marketplace, or to enable others of ordinary skills in the art to understand the embodiments described herein.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for providing a smart room tracking system coupled with exhibit controllers and room interactive elements with patron tiered permissions (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed by a processor for reducing exposure of a plurality of objects to environmental conditions by employing a smart room tracking system, the method comprising:

counting a number of individuals within a space including the plurality of objects via one or more image capture devices;

determining whether each individual makes direct eye contact with any of the plurality of objects;

shielding, via an object viewing controller associated with each object of the plurality of objects, an object of the plurality of objects from view when no direct eye contact is determined; and evaluating each object of the plurality of objects to determine a total amount of time the object is exposed during a predetermined time period.

2. The method of claim 1, wherein the direct eye contact is determined by evaluating orientation, posture, and eye movement of each individual.

3. The method of claim 1, further comprising making an object of the plurality of objects viewable, via the object viewing controller, when direct eye contact is determined.

4. The method of claim 1, further comprising determining a total number of objects of the plurality of objects viewed by each individual and a time duration for viewing the total number of objects.

5. The method of claim 1, further comprising assigning an access or privilege status to each individual, the access or privilege status employed to influence viewability status of each of the plurality of objects.

6. The method of claim 1, further comprising assigning viewability rules to each of the plurality of objects.

7. The method of claim 1, further comprising limiting viewability of one or more of the plurality of objects based on whether the total exposure time has been exceeded.

8. The method of claim 1, further comprising creating a customized viewability profile for each individual.

9. The method of claim 8, further comprising comparing customized viewability profiles of individuals to determine at least objects of strong or weak interest.

10. The method of claim 1, further comprising predicting future objects to be viewed by an individual of the plurality of individuals based on current viewing patterns of the individual, predicting a time at which the individual views the future objects, and communicating predictions to at least object viewing controllers controlling the plurality of objects.

11. The method of claim 1, further comprising detecting and preventing unauthorized duplication or recording of the plurality of objects by each individual.

12. The method of claim 1, further comprising receiving feedback from each individual based on select objects of the plurality of objects viewed.

13. The method of claim 1, further comprising preventing viewing of objectionable objects of the plurality of objects based on at least group preferences indicated upon entry into the space.

14. A smart room tracking system for reducing exposure of a plurality of objects to environmental conditions, the system comprising:

one or more cameras for counting a number of individuals within a space including the plurality of objects, wherein each of the one or more cameras includes an optical sensor for determining whether each individual makes direct eye contact with any of the plurality of objects by evaluating orientation, posture, and eye movement of each individual; and headphones or glasses associated with the number of individuals activated based on information received from the smart room tracking system;

wherein each object of the plurality of objects is evaluated to determine a total amount of time the object is exposed during a predetermined time period.

15. The system of claim 14, further comprising a controller to shield an object of the plurality of objects from view when no direct eye contact is determined and making an object of the plurality of objects viewable when direct eye contact is determined.

16. The system of claim 14, wherein a determination is made as to a total number of objects of the plurality of objects viewed by each individual and a time duration for viewing the total number of objects.

17. The system of claim 14, wherein an access or privilege status is assigned to each individual, the access or privilege status employed to influence viewability status of each of the plurality of objects.

18. The system of claim 14, wherein viewability rules are assigned to each of the plurality of objects.

19. The system of claim 14, wherein viewability of one or more of the plurality of objects is limited based on whether the total exposure time has been exceeded.

20. The system of claim 14, wherein a customized viewability profile is created for each individual and wherein customized viewability profiles of individuals are compared to determine at least objects of strong or weak interest.

\* \* \* \* \*